(12) United States Patent
Knorr et al.

(10) Patent No.: US 7,783,152 B2
(45) Date of Patent: Aug. 24, 2010

(54) APPARATUS FOR RESTRAINING FIBER OPTIC CABLES

(75) Inventors: Jens Knorr, Werdohl (DE); Thorsten Müller, Menden (DE); Roman Arnold Theodor Syplacz, Hagen (DE); Wolf Kluwe, Iserlohn (DE)

(73) Assignee: CCS Technology, Inc., Wilmington, DE (US)

( * ) Notice: Subject to any disclaimer, the term of this patent is extended or adjusted under 35 U.S.C. 154(b) by 0 days.

(21) Appl. No.: 12/249,480

(22) Filed: Oct. 10, 2008

(65) Prior Publication Data

US 2009/0087158 A1 Apr. 2, 2009

Related U.S. Application Data

(63) Continuation of application No. PCT/EP2007/001520, filed on Feb. 22, 2007.

(30) Foreign Application Priority Data

Apr. 11, 2006 (DE) .................. 20 2006 006 018 U

(51) Int. Cl.
*G02B 6/44* (2006.01)
(52) U.S. Cl. ...................................... 385/136
(58) Field of Classification Search ........................ None
See application file for complete search history.

(56) References Cited

U.S. PATENT DOCUMENTS

| | | | |
|---|---|---|---|
| 4,805,979 A * | 2/1989 | Bossard et al. | 385/135 |
| 4,991,928 A * | 2/1991 | Zimmer | 385/137 |
| 5,787,219 A * | 7/1998 | Mueller et al. | 385/134 |
| 5,793,920 A | 8/1998 | Wilkins et al. | 385/135 |
| 5,824,961 A * | 10/1998 | Burek et al. | 174/135 |
| 2004/0156611 A1* | 8/2004 | Cloud et al. | 385/135 |
| 2009/0103881 A1* | 4/2009 | Gonzalez et al. | 385/137 |

FOREIGN PATENT DOCUMENTS

| | | |
|---|---|---|
| DE | 3726718 A1 | 2/1989 |
| DE | 3726719 A1 | 2/1989 |
| DE | 4231181 C1 | 8/1993 |
| DE | 10338848 A1 | 3/2005 |
| DE | 202005009932 | 12/2005 |
| EP | 0693699 B1 | 1/1996 |
| WO | WO93/26070 | 12/1993 |
| WO | WO97/12268 | 4/1997 |

* cited by examiner

*Primary Examiner*—Mike Stahl
(74) *Attorney, Agent, or Firm*—C. Paul Lewallen

(57) ABSTRACT

An apparatus for restraining fiber optic cables in the region of a sealing body of a cable sleeve, namely within an interior delimited by the cable sleeve is disclosed. The apparatus has a fitting part which is capable of being fastened on the sealing body of the cable sleeve, and which has a plurality of slide parts acting on the fitting part. Each slide part is used for individually restraining a single fiber optic cable and is capable of being moved in terms of its position relative to the fitting part within predetermined limits for the purpose of matching said slide part to a cable diameter of the respective fiber optic cable to be restrained. Guide parts act on the slide parts, with each guide part being used for individually restraining a central element of the fiber optic cable to be restrained on the corresponding slide part and being capable of being moved in terms of its position relative to the slide part within predetermined limits for the purpose of aligning said slide part centrally with respect to the central element of the respective fiber optic cable to be restrained.

7 Claims, 3 Drawing Sheets

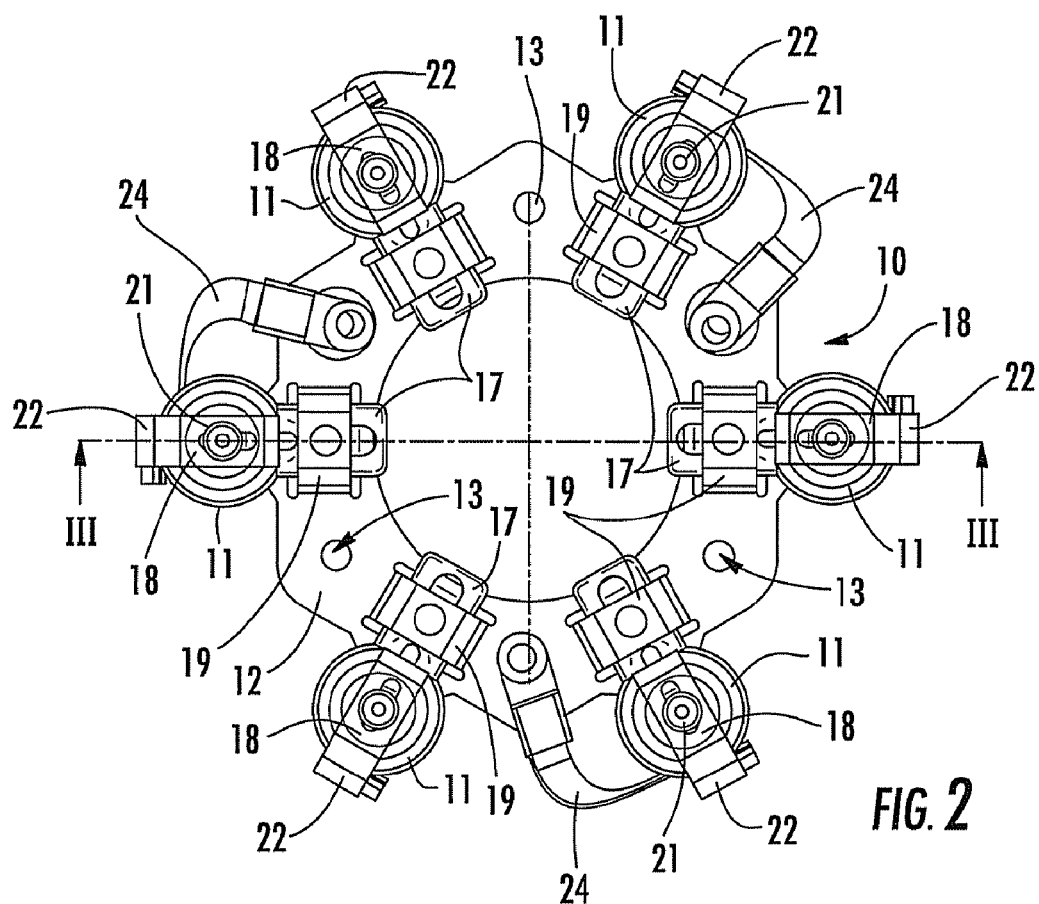
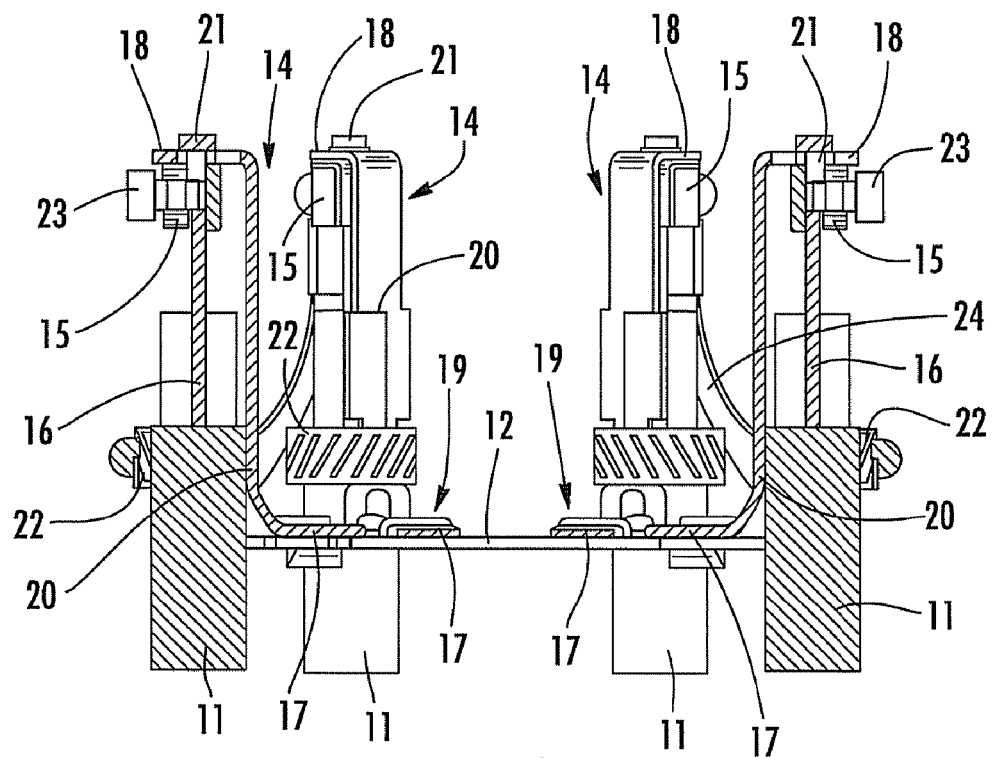

APPARATUS FOR RESTRAINING FIBER OPTIC CABLES

CROSS-REFERENCE TO RELATED APPLICATIONS

This application is a continuation of International Application No. PCT/EP2007/001520, filed Feb. 22, 2007, which claims priority to German Application No. DE202006006018.9, filed Apr. 11, 2006, both applications being incorporated herein by reference.

BACKGROUND

1. Technical Field

The invention relates to fiber optic cables, and more particularly to an apparatus for restraining fiber optic cables.

2. Technical Background

When designing fiber optic cable networks it is necessary to provide so-called junctions or branch junctions for the fiber optic cables, with splices being formed between optical waveguides guided in the fiber optic cables at the junctions or branch junctions. In order to protect the spliced joints at the junctions or branch junctions, the spliced joints are laid in so-called cable sleeves, the fiber optic cables being inserted into an interior of a cable sleeve via a sealing body of the cable sleeve. The fiber optic cables are restrained outside or inside the cable sleeve with respect to tensile loading and possibly also torsional loading and bending loading, with special restraining apparatuses being used for this purpose.

SUMMARY OF THE DETAILED DESCRIPTION

Embodiments disclosed in the detailed description relate to an apparatus for restraining fiber optic cables in the region of a sealing body of a cable sleeve, namely within an interior delimited by the cable sleeve. The apparatus has a fitting part which is capable of being fastened on the sealing body of the cable sleeve, and which has a plurality of slide parts acting on the fitting part. Each slide part is used for individually restraining a single fiber optic cable and is capable of being moved in terms of its position relative to the fitting part within predetermined limits for the purpose of matching said slide part to a cable diameter of the respective fiber optic cable to be restrained. Guide parts act on the slide parts, with each guide part being used for individually restraining a central element of the fiber optic cable to be restrained on the corresponding slide part and being capable of being moved in terms of its position relative to the slide part within predetermined limits for the purpose of aligning said slide part centrally with respect to the central element of the respective fiber optic cable to be restrained.

A plurality of fiber optic cables can be restrained individually with respect to tensile loading, torsional loading and bending loading, it being possible for the apparatus to be matched to different cable diameters of the fiber optic cables to be restrained. In order to match the apparatus to the cable diameters of the fiber optic cables, firstly the slide parts are capable of being moved with respect to the fitting part in order thus to align the slide parts with respect to a casing surface of the fiber optic cables to be restrained, and secondly the guide parts are capable of being moved with respect to the slide parts in order thus to align the guide parts with respect to the central elements of the fiber optic cables to be restrained.

BRIEF DESCRIPTION OF THE FIGURES

Exemplary embodiments of the invention will be explained in more detail, without the invention being restricted to this embodiment, with reference to the drawing, in which:

FIG. 2 shows the apparatus according to the invention for restraining fiber optic cables from FIG. 1 in plan view;

FIG. 3 shows a cross section through the apparatus according to the invention for restraining fiber optic cables from FIGS. 1 and 2 along the section line III-III in FIG. 2.

DETAILED DESCRIPTION

Figure 1:
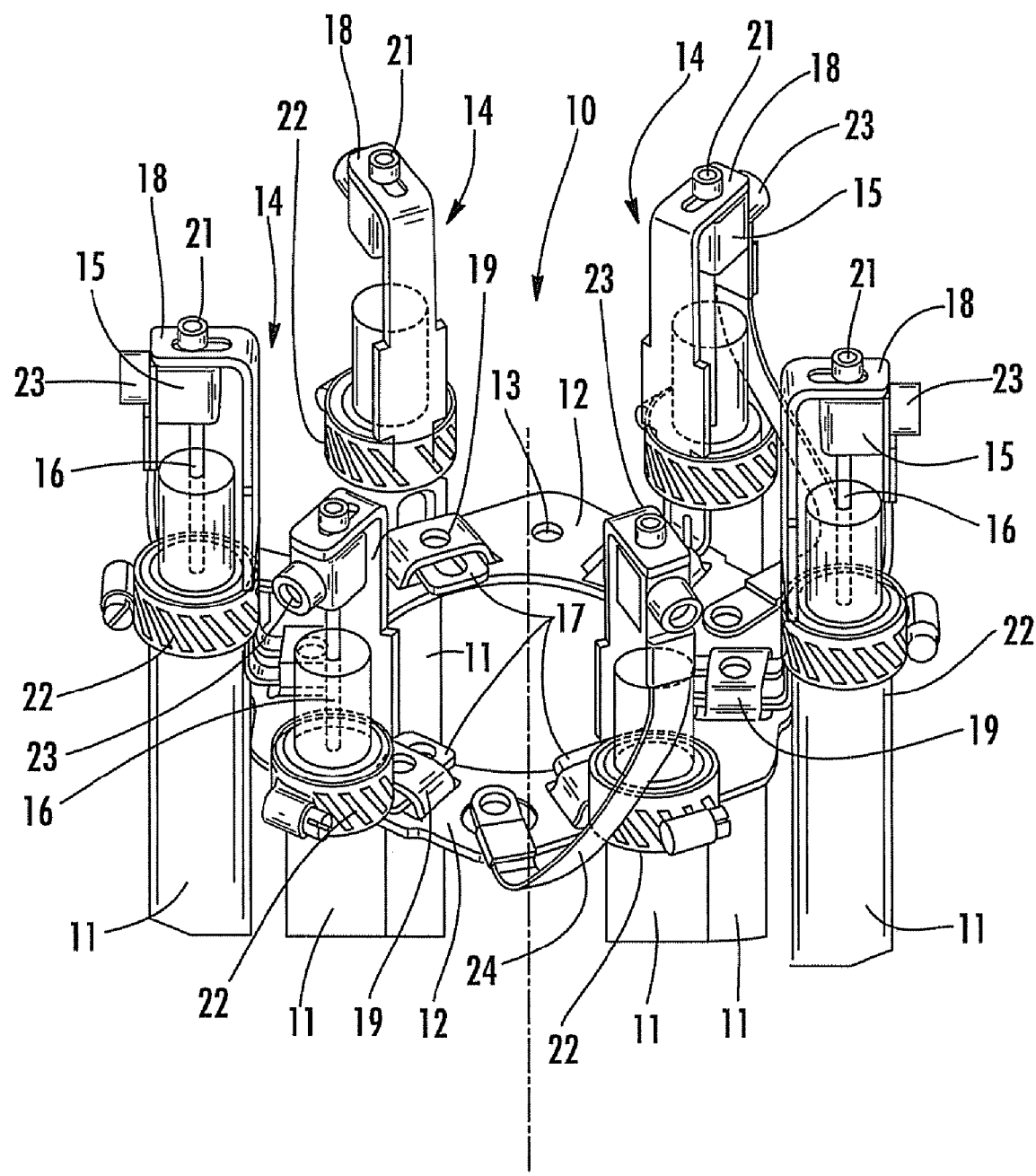
FIG. 1 shows a perspective view of an apparatus according to the invention for restraining fiber optic cables in accordance with a first exemplary embodiment of the invention together with six fiber optic cables restrained using the apparatus.

An exemplary embodiment will be described in greater detail below with reference to FIGS. 1 to 3. FIGS. 1 to 3 show different views of an apparatus 10 for restraining fiber optic cables in accordance with a first exemplary embodiment with six total fiber optic cables 11 restrained using the apparatus 10. The apparatus 10 according to the invention is in this case used for restraining the fiber optic cables 11 in an interior of a cable sleeve (not illustrated), the fiber optic cables 11 being inserted into the interior of the cable sleeve via insertion openings of a sealing body of said cable sleeve.

The apparatus 10 according to the embodiment has a fitting part 12, the fitting part 12 being capable of being fastened on the sealing body (not illustrated) of a cable sleeve. In the exemplary embodiment illustrated the fitting part 12 is in the form of a ring and is capable of being fixed non-displaceably on the sealing body of the cable sleeve via fastening screws (not illustrated), which extend through bores 13 introduced into the fitting part 12.

In addition to the ring-shaped fitting part 12, the apparatus 10 has a plurality of slide parts 14 acting on the fitting part 12. In the exemplary embodiment shown, in total six slide parts 14 act on the ring-shaped fitting part 12, each slide part 14 being used for individually restraining a single fiber optic cable 11. Each of the slide parts 14 is capable of being moved relative to the fitting part 12 within predetermined limits, namely in the radial direction of the fitting part 12 or of a sealing body of a cable sleeve on which the fitting part 12 is fastened, for the purpose of matching said slide parts to a cable diameter of the respective fiber optic cable 11 to be restrained.

In addition to the fitting part 12 and the slide parts 14, the apparatus 10 has guide parts 15, with a guide part 15 being associated with each slide part 14 in the exemplary embodiment shown. Each guide part 15 is used for individually restraining a central element 16 of the fiber optic cable 11 to be restrained on the corresponding slide part 14. Each guide part 15 is capable of being moved relative to the corresponding slide part 14 within predetermined limits, to be precise in the radial direction of the fitting part 12 or of a sealing body (not illustrated) of a cable sleeve on which the fitting part 12 is fastened, for the purpose of matching the guide parts 15 to different cable diameters of the fiber optic cables 11 to be restrained on the corresponding slide parts 14.

In the apparatus 10 for restraining the fiber optic cables 11, firstly the slide parts 14 can therefore be moved relative to the fitting part 12 in order thus to cause said slide parts 14 to come to bear against an outer casing surface of the fiber optic cables 11 to be restrained and to restrain the fiber optic cables 11 on the slide parts 14. Secondly, the guide parts 15 can be moved relative to the slide parts 14 in order to align the latter precisely with respect to central elements 16 to be restrained of the fiber optic cables 11, with the result that the central elements 16 do not need to be bent or bent back in order for them to be restrained. Each central element 16 of a fiber optic cable 11 can thus be restrained centrally in centered fashion on the apparatus 10.

With the aid of the apparatus 10, tensile forces, shearing forces, bending forces and torsional forces acting on the fiber optic cables 11 and their central elements 16 can thus be reduced or compensated for.

Each slide part 14 of the apparatus 10 according to the invention has a base plate, which has end sections 17 and 18 which are bent back in different directions at two opposite ends. Via first end sections 17, the slide parts 14 act on the fitting part 12, namely on U-shaped protuberances 19 of the fitting part 12. The first end sections 17 of the slide parts 14 are inserted into the U-shaped protuberances 19 of the fitting part 12 and mounted displaceably therein. By means of this displacement, the slide parts 14 can be matched to the cable diameter of a fiber optic cable 11 to be restrained on said slide parts 14, to be precise in such a way that a central section 20 of the slide parts 14 can be brought to bear against a cable sheath of the fiber optic cables 11 to be restrained.

The relative position of a slide part 14 relative to the fitting part 12 can be fixed via a locking screw (not illustrated), which extends through a bore in the U-shaped protuberance 19 and through a slot within the first end section 17 of the slide part 14. When the locking screw is released, the slide part 14 can be displaced relative to the U-shaped protuberance 19 of the central part 14, in which case the position of the locking screw then changes relative to the slot of the first end section 17 of the slide part 14. When the locking screw is tightened, the latter fixes the relative position of the slide part 14 with respect to the fitting part 12.

In the region of each slide part 14, a guide part 15 acts on the second end section 18 of the slide parts 14, which second end section 18 is bent in the opposite direction relative to the first end section 17 of said slide parts 14.

The guide part 15 is mounted displaceably on the second end section 18 of the corresponding slide part 14, to be precise in such a way that a locking screw 21, which acts on the guide part 15, is guided in a slot of the second end section 18 of the corresponding slide part 14, in which case, when the locking screw 21 is loosened, the latter and therefore the corresponding guide part 15 is capable of being displaced linearly relative to the slide part 14.

In order to restrain the fiber optic cables 11, they are fastened on the central section 20 of a slide part 14 via a cable clamp 22 in the exemplary embodiment shown. Such cable clamps are also referred to as hose clamps. Instead of cable clamps, cable ties can also be used for fastening and therefore restraining the optical cables 11 on the slide parts 14.

The guide parts 15, as can best be seen in FIG. 3, have a bore, into which a central element 16 of a fiber optic cable 11 can be inserted in order to restrain said fiber optic cable 11. By means of the linear movability of the guide part 15 relative to the second end section 18 of the slide part 14 as already described above, this bore of the guide part 15 can be aligned precisely centrally with respect to the central element 16 to be restrained of the fiber optic cable, with the result that the central element 16 can be inserted linearly into the bore of the respective guide part without being bent back or deflected in any way. A fixing screw 23 in this case is used for fixing the central element 16 in the bore of the guide part 15.

Each central element 16 of a fiber optic cable 11 can be grounded individually. In each case one grounding strip 24 is used for this purpose, which grounding strip 24 acts with a first end on the fitting part 12 of the apparatus 10 and with a second end on the guide part 15 in which the respective central element 16 is restrained. In the exemplary embodiment shown, the central elements 16 of three fiber optic cables 11 are individually grounded via in each case one grounding strip 24.

In the apparatus according to the invention for restraining fiber optic cables, a plurality of fiber optic cables and their central elements can therefore be restrained individually, with firstly the slide parts 14, which are each used for individually restraining a fiber optic cable 11, being capable of being displaced individually linearly relative to the fitting part 12, and with secondly the guide parts 15, which are used for restraining the central elements 16 of the respective fiber optic cables 11, being capable of being moved linearly relative to the respective slide part 14 in order to align the latter centrally with respect to the central element to be restrained. This can ensure that a central element 16 of a fiber optic cable 11 does not need to be bent out in order for it to be restrained. Instead, the apparatus according to the invention can be matched continuously to different diameters of the fiber optic cables 11 and resultant different positions of the central elements 16.

The slide parts 14 of the apparatus 10 are arranged distributed approximately evenly over the circumference of the ring-shaped fitting part 12. The slide parts 14, together with the ring-shaped fitting part 12, form a star-shaped restraining apparatus, with, as has already been mentioned, firstly the slide parts 14 being capable of being moved continuously in the radial direction relative to the fitting part 12, and secondly with the guide parts 15 being capable of being moved continuously in the radial direction relative to the respective slide part 14 and therefore to the fitting part 12. As a result, tensile forces, shearing forces, bending forces and torsional forces acting on the fiber optic cables 11 and their central elements 16 can be compensated for and/or intercepted.

Figure 4:
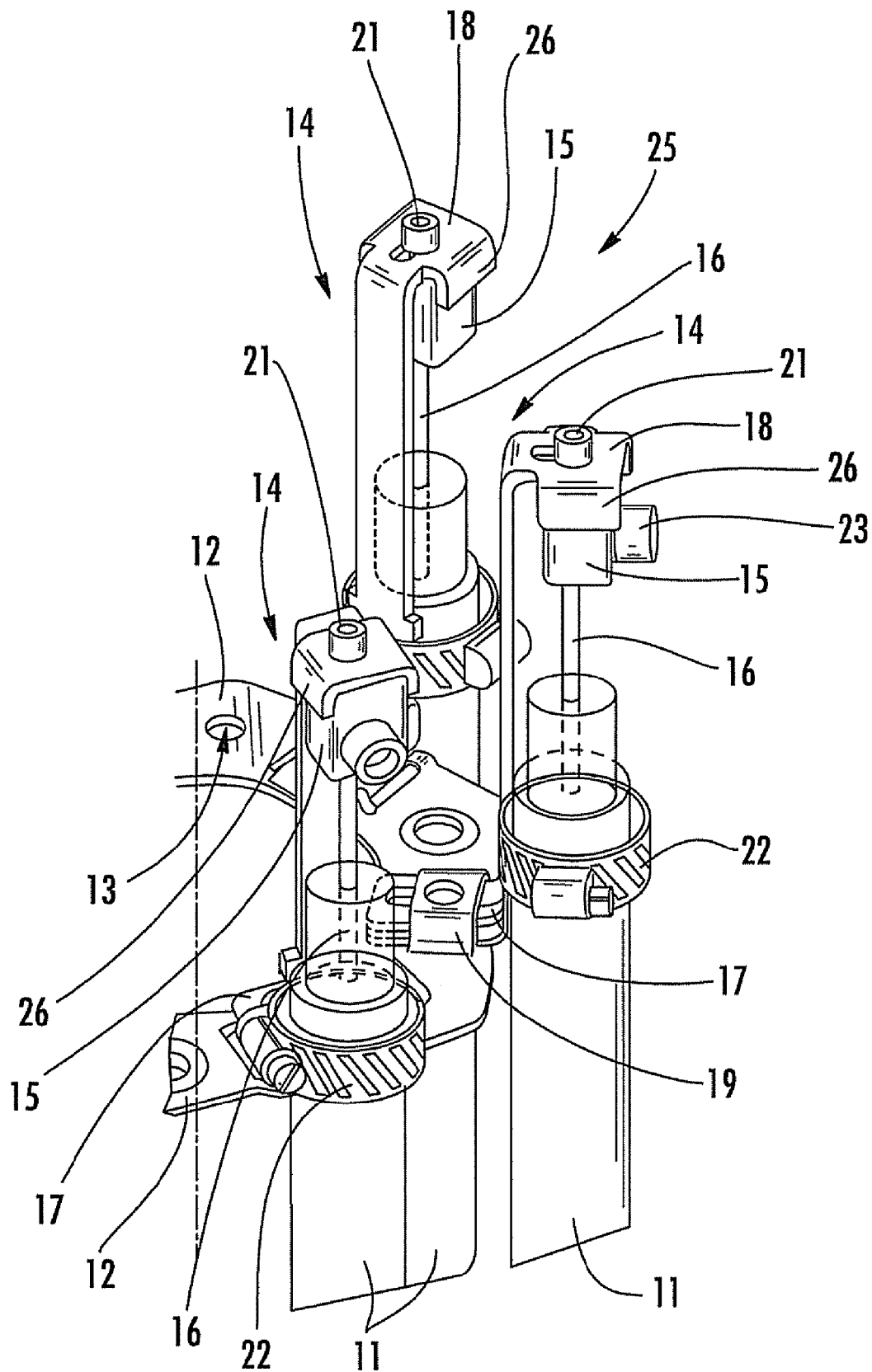
FIG. 4 shows a detail of an apparatus according to the invention for restraining fiber optic cables in accordance with a second exemplary embodiment of the invention in a view similar to that in FIG. 1.

FIG. 4 shows a detail of an apparatus 25 according to the invention for restraining fiber optic cables in accordance with another exemplary embodiment of the invention together with three fiber optic cables 11 restrained using the apparatus 25.

Since the exemplary embodiment in FIG. 4 substantially corresponds to the exemplary embodiment in FIGS. 1 to 3, identical reference numerals are used for identical assemblies in order to avoid unnecessary repetition and the text which follows will only give details representing differences between the exemplary embodiment in FIG. 4 and the exemplary embodiment in FIGS. 1 to 3.

The exemplary embodiment in FIG. 4 differs from the exemplary embodiment in FIGS. 1 to 3 merely by virtue of the fact that the slide parts 14 have, in the region of the second end sections 18, sections or lugs 26 which are bent back downward and which are used for securing the guide parts 15 against rotation on the respective second end section 18 of a slide part 14. As a result, the installation friendliness can be increased.

What is claimed is:

1. An apparatus for restraining fiber optic cables in the interior of a sealing body of a cable sleeve, comprising:
a fitting part, wherein the fitting part is capable of being fastened on the sealing body of the cable sleeve, a plurality of slide parts acting on the fitting part, each of the plurality of slide parts used for individually restraining a single fiber optic cable, and wherein each of the plurality of slide parts is capable of being moved relative to the fitting part within predetermined limits for the purpose of matching the slide part to a cable diameter of the fiber optic cable to be restrained, and wherein at least one of the plurality of slide parts has a guide part, the guide part being used for individually restraining a central element of the fiber optic cable to be restrained on the slide part, wherein the guide part is movable relative to the slide part within predetermined limits, to radially align the slide part centrally with respect to the central element of the fiber optic cable to be restrained.

2. The apparatus of claim 1, wherein the fitting part is in the form of a ring and is capable of being fastened non-displaceably on the sealing body of the cable sleeve.

3. The apparatus of claim 1, wherein each slide part has a base plate, which has end sections which are bent back in different directions at two opposite ends, the slide part acting on the fitting part via a first end section and being capable of being moved relative to the fitting part in the radial direction of the sealing body via the first end section, and the guide part acting on the second end section of the slide part, the guide part capable of being moved relative to the slide part in the radial direction of the sealing body on the second end section.

4. The apparatus of claim 3, wherein the fiber optic cable to be restrained on the slide part is capable of being fastened via a cable clamp or a cable tie on a central section of the slide part which extends between the two end sections of the slide part.

5. The apparatus of claim 3, wherein the relative position of a slide part with respect to the fitting part is capable of being fixed by means of a locking screw which acts on the first end section of the slide part.

6. The apparatus of claim 3, wherein the relative position of a guide part with respect to the corresponding slide part can be fixed by means of a locking screw which acts on the second end section of the slide part.

7. The apparatus of claim 1, wherein the central element of each fiber optic cable can be individually grounded via a grounding strip, which acts firstly on the fitting part and secondly on the guide part in which the respective central element is restrained.

* * * * *